United States Patent [19]

Jacobs

[11] 3,871,122
[45] Mar. 18, 1975

[54] FISH LURE
[76] Inventor: Dennis Y. Jacobs, 5536 25th St. W., Bradenton, Fla. 33507
[22] Filed: Jan. 15, 1973
[21] Appl. No.: 323,694

[52] U.S. Cl. .............................................. 43/42.27
[51] Int. Cl. ............................................ A01k 83/06
[58] Field of Search ...................... 43/42.27, 42.26

[56] References Cited
UNITED STATES PATENTS
| | | | |
|---|---|---|---|
| 1,540,586 | 6/1925 | Adam | 43/42.26 |
| 1,738,617 | 12/1929 | Scharrer | 43/42.27 X |
| 2,242,708 | 5/1941 | Lancaster | 43/42.27 |
| 2,448,523 | 9/1948 | Fibiger | 43/42.27 |
| 2,719,377 | 10/1955 | Bennett | 43/42.27 |
| 2,760,294 | 8/1956 | Morrill, Jr. | 43/42.27 |

*Primary Examiner*—Louis G. Mancene
*Assistant Examiner*—J. Q. Lever

[57] ABSTRACT

The present fish lure or plug is a simulation of an Odonata, more familarly known as a dragonfly, which is well known to be one of the most natural surface foods that bass feed upon and comprises a body simulating the body of the dragonfly which is made of wood and has annular grooves in it to form a simulation of the head of the dragonfly, a pair of flexible wings attached to the top of the body above the thorax and a plurality of annular grooves cut in the wooden body rearwardly of the wings spaced in such manner as to simulate the body of the dragonfly. A line attaching eye is threaded into the outer end and centrally of the head portion of the body and a series of treble gang hooks are attached to the body, for instance, two at spaced distances to the abdomen of the body and extending downwardly therefrom and a third attached to the tail end of the body, all of which hooks are so located that they will cause the body to fall approximately flat on the water when the lure is cast.

1 Claim, 3 Drawing Figures

FISH LURE

An object of the present invention is to provide a fish lure designed specifically for bass fisherman that enjoy seeing the initial attack of a vocarious fish, which lure resembles one of the most natural foods that the bass feed upon, the dragonfly (Odonata). When the lure is cast in any given direction or from any casting position it will fall into the water very much like a live dragonfly. The weight of the hooks and the aerodynamic structure and position of the wings will cause the lure to right itself in the air and fall into the water in a natural horizontal position with the hooks down. After settling in the water for a few seconds a very light twitch of the rod tip will cause the wings to flutter very similar to a dragonfly in distress. This may be repeated several times for best results.

With these and other objects in view, as may appear from the accompanying specification, the invention consists of various features of construction and combinations of parts, which will be first described in connection with the accompanying drawings, showing a Fish Lure of a preferred form embodying the invention and the features forming the invention will be specifically pointed out in the claims.

Figure 1:
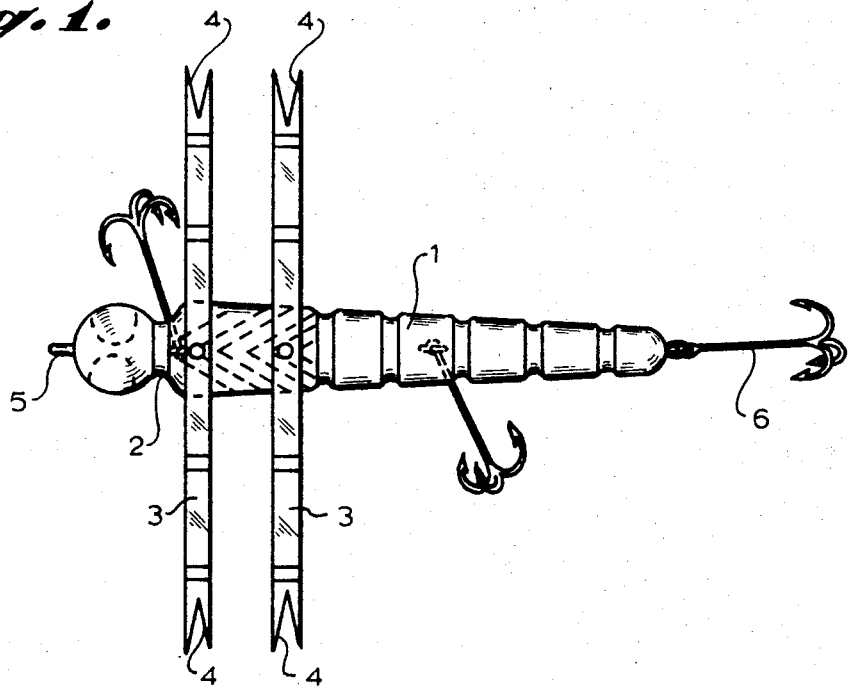
FIG. 1 is a top plan view of the fishing lure.
Figure 2:
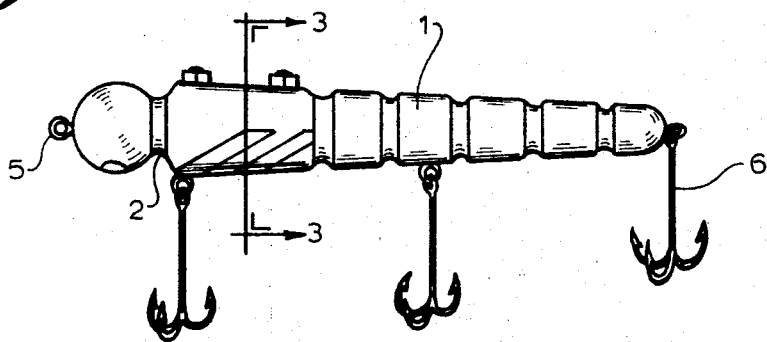
FIG. 2 is a side elevation of the fishing lure.
Figure 3:
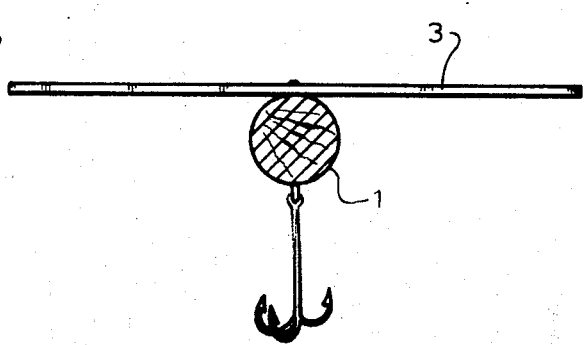
FIG. 3 is a cross sectional view taken on the line 3—3 of FIG. 2.

Referring more particularly to the drawings the fish lure includes an elongated body in the shape of the body of a dragonfly. The body 1 is made of wood of a type suitable for the making of lures, or it may be made of any other suitable material which is bouyant in water and it has an annular groove 2 cut therein a short distance inwardly of the end of the lure at its larger end to form a simulated head of the dragonfly. Directly to the rear of the annular groove 2 are a pair of flexible wings made of a rubber composition, such as the inner tubes of automobile tires. There are two of these wings 3 and each wing constitutes a single strip of material of a length substantially the same length of the body 1 and it is attached to the body 1 intermediate its ends providing flexible wing sections of substantially one half the length of the body projecting laterally from each side of the body and the outer ends of the wings are bifurcated as clearly shown at 4 in FIG. 1 to more nearly simulate the wings of a dragonfly and to further assist in the stirring up or vibration of the water as the lure is drawn over the surface of the water during use. The body 1 is provided with a plurality of spaced annular grooves therein spaced rearwardly from the wings along the length of the body to further add to the simulation of a dragonfly. A screw eye 5 is threaded into the outer end of the head of the body to which eye a fishing line is connected. A triple gang hook 6 is connected to the tail end of the body so that the hook will hang downwardly from the body. A pair of triple gang hooks are attached to the underside of the body, one being spaced at the thorax of the body and the other between the thorax or forward gang hook and the tail gang hook 5. All of these gang hooks are connected to the body 1 by suitable eyes at the center of gravity of the body so that when the lure is cast the body will travel in a position with the wings on the upper side of the body in substantially exact simulation of the flight of a dragonfly.

The aerodynamic structure of the lure will, when the lure is cast cause the weight of the hooks to force the correct position of the wings which bend or flex with the friction of the atmosphere. The bending and flexing of the wings 4 stabalize the lure in flight preventing undesirable action of the lure during flight and allow the plug or lure to appear real and settle correctly in the water. As the lure is drawn along the water by the fisherman the wings will vibrate and agitate the water simulating a dragonfly in distress and attract the fish.

This action is provided by the flexible wings in contrast to the whirling action which would be inaugurated in many instances should the wings be rigid, such whirling action would cause an unnatural action of a dragonfly and greatly impair the attractiveness of the lure to fish.

The body 1 is painted to simulate the color of a dragonfly and the color may vary to depict anyone of the many species of dragonflies. The paint of the body is protected by a suitable number of coats of lacquer. The body and the wings may be painted with suitable markings to indicate individual markings of the species of dragonfly simulated by the overall color of the body.

It will be understood that the invention is not to be limited to the specific construction or arrangement of parts shown, but that they may be modified within the invention defined by the claims.

What is claimed is:

1. A fishing lure constructed to simulate the body of a dragon fly, said body constructed of floatable material, such as wood and having a forward annular groove cut therein to simulate the head of a dragon fly, said body continuing in a straight line from its front head portion to its rear portion extending in a straight axial line thereby being free from motion creating curvatures, a pair of flat strips flexible tough rubber attached to the upper surface of the body intermediate their ends and extending laterally to each side of the body and in parallel relation to each other rearwardly of the head simulating groove, said rubber strips being free of any curvatures whereby when the lure is drawn over the surface of the water the lure will be prevented from rising from or skipping above the surface of the water, said strips spaced sufficient distance apart whereby the positions of the flat strips on either side of the body are capable of independent movement relative to each other and the body to cause unrelated movement of the portions of the strips on opposite sides of the body to create agitation in the water while the lure is being drawn through the water and simulate a dragon fly in distress, and one or more gang hooks attached axially to the body and depending therefrom and so located as to counter-balance the action of the flexible wing forming strips while the lure is either in flight or in action through the water.

* * * * *